(12) United States Patent
Kimura et al.

(10) Patent No.: US 11,821,864 B2
(45) Date of Patent: Nov. 21, 2023

(54) SULFURIZATION DETECTION SENSOR

(71) Applicant: KOA CORPORATION, Nagano (JP)

(72) Inventors: Taro Kimura, Nagano (JP); Kentaro Matsumoto, Nagano (JP)

(73) Assignee: KOA CORPORATION, Nagano (JP)

( * ) Notice: Subject to any disclaimer, the term of this patent is extended or adjusted under 35 U.S.C. 154(b) by 238 days.

(21) Appl. No.: 17/617,122

(22) PCT Filed: May 21, 2020

(86) PCT No.: PCT/JP2020/020088
§ 371 (c)(1),
(2) Date: Dec. 7, 2021

(87) PCT Pub. No.: WO2020/246253
PCT Pub. Date: Dec. 10, 2020

(65) Prior Publication Data
US 2022/0229004 A1 Jul. 21, 2022

(30) Foreign Application Priority Data
Jun. 7, 2019 (JP) .................................. 2019-107249

(51) Int. Cl.
*G01N 27/12* (2006.01)
*G01N 17/00* (2006.01)
(52) U.S. Cl.
CPC ............. *G01N 27/12* (2013.01); *G01N 17/00* (2013.01)
(58) Field of Classification Search
CPC ........ G01N 27/00; G01N 27/02; G01N 27/04; G01N 27/12; G01N 17/00
(Continued)

(56) References Cited

U.S. PATENT DOCUMENTS 4,822,465 A * 4/1989 Jones ..................... G01N 27/12
73/31.03
6,638,415 B1 * 10/2003 Hodges ................. G01N 33/84
204/403.02
(Continued)

FOREIGN PATENT DOCUMENTS

JP 2002064003 A 2/2002
JP 2018200174 A 12/2008
(Continued)

OTHER PUBLICATIONS

International Search Report related to Application No. PCT/JP2020/020088; dated Jul. 7, 2020.

*Primary Examiner* — Hoai-An D. Nguyen
(74) *Attorney, Agent, or Firm* — von Briesen & Roper, s.c.

(57) ABSTRACT

A sulfurization detection sensor 10 comprises: a rectangular parallelepiped insulation substrate 1, a pair of front electrodes 2 provided at both ends of a front surface in the longitudinal direction of the insulation substrate 1, respectively, a sulfurization detection conductor 3 connected between the front electrodes 2, a pair of protective films 4 for covering a part of the sulfurization detection conductor 3 and that of the front electrodes 2, respectively, a pair of back electrodes 5 provided at both ends of a back surface in the longitudinal direction of the insulation substrate 1, respectively, a pair of end face electrodes 6 provided at both ends in the longitudinal direction of the insulation substrate 1, respectively, and external electrodes 7 provided on front surfaces of the end face electrodes 6, respectively. Specific regions 3*b* in which a current hardly flows are formed at both ends in the Y-direction of a sulfurization detection portion 3A.

3 Claims, 4 Drawing Sheets

(58) Field of Classification Search
USPC .................................. 324/600, 649, 691, 693
See application file for complete search history.

(56) References Cited

U.S. PATENT DOCUMENTS

| | | | |
|---|---|---|---|
| 9,134,265 B2* | 9/2015 | Akiyama | G01N 27/125 |
| 9,880,523 B2* | 1/2018 | Suwald | G04F 10/10 |
| 9,891,188 B2* | 2/2018 | Hashida | G01N 27/419 |
| 11,506,594 B2* | 11/2022 | Kimura | G01N 17/04 |
| 2015/0003213 A1 | 1/2015 | Suwald | |
| 2016/0247610 A1* | 8/2016 | Shinoura | H01C 1/142 |
| 2020/0066429 A1* | 2/2020 | Imahashi | H01C 17/006 |
| 2022/0091058 A1* | 3/2022 | Otsuka | H01C 17/22 |

FOREIGN PATENT DOCUMENTS

| | | | |
|---|---|---|---|
| JP | 2009250611 A | 10/2009 | |
| JP | 2011142117 A | 7/2011 | |

* cited by examiner

SULFURIZATION DETECTION SENSOR

TECHNICAL FIELD

The present invention relates to a sulfurization detection sensor for detecting a cumulative amount of sulfide in a corrosive environment.

BACKGROUND ART

As an internal electrode of an electronic component such as a chip resistor, generally, an Ag (silver) based electrode material having a low specific resistance is used. However, silver sulfide occurs when silver is exposed to sulfide gas and the silver sulfide is an insulator, which may result in malfunction such as disconnection of the electronic component. In recent years, measures against sulfurization, such as forming an electrode that hardly gets sulfurized by adding Pd (palladium) and Au (gold) to Ag, or forming the electrode into a structure that prevents the sulfide gas from reaching the electrode have been taken.

However, even when such measures against sulfurization are taken for the electronic component, in the case where the electronic component is exposed to sulfide gas for a long time or exposed to high-concentration sulfide gas, disconnection cannot be prevented completely. Accordingly, it is necessary to detect the disconnection in advance to prevent failure from occurring at an unexpected timing.

With this regard, as described in Patent Literature 1, there has been proposed a sulfurization detection sensor capable of detecting the degree of cumulative sulfide in an electronic component to detect a risk of failure such as disconnection which occurs in the electronic component due to sulfurization. By way of example, a sulfurization detection sensor disclosed in Patent Literature 1 is configured such that a sulfurization detection body mainly made of Ag is provided on an insulation substrate, a transparent protective film having sulfide gas permeability is provided so as to cover the sulfurization detection body, and end face electrodes connected to the sulfurization detection body are provided, respectively, at both side end portions of the insulation substrate.

When the sulfurization detection sensor configured as above is mounted on a circuit board together with other electronic components and then the circuit board is used in an atmosphere containing sulfide gas, the other electronic components get sulfurized over time, and the sulfide gas passes through the protective film of the sulfurization detection sensor and comes into contact with the sulfurization detection body, whereby decreasing the volume of silver forming the sulfurization detection body in accordance with the concentration of the sulfide gas and the elapsed time. Accordingly, by detecting change in the resistance values and disconnection in the sulfurization detection body, it is possible to detect the degree of sulfurization.

CITATION LIST

Patent Literature

Patent Literature 1: JP-A-2009-250611

SUMMARY OF INVENTION

Technical Problem

In the case of the sulfurization detection sensor as disclosed in Patent Literature 1, on which the sulfurization detection body is formed into a rectangular shape on a main surface of the insulation substrate, the sulfurization detection body in contact with the sulfide gas gets sulfurized not only in a film thickness direction from a surface side facing the main surface of the insulation substrate, but also in a direction from both end faces, which is perpendicular to a current direction. However, on the side end portions of the sulfurization detection body, which are formed by printing such as Ag-based paste, the width dimension (length in the direction perpendicular to the current direction) and surface area of the sulfurization detection body are liable to be varied due to the influence of printing sag or the like, resulting in occurrence of individual differences in the speed of sulfurization from the side end faces of the sulfurization detection body. As a result, it becomes difficult to accurately detect the degree of sulfurization based on a resistance value of the sulfurization detection sensor.

That is, change in the resistance value of the sulfurization detection sensor depends on change in the volume of the sulfurization detection body, and the change in the volume thereof depends on change in the length in the current direction of the sulfurization detection body and cross-sectional area along the direction perpendicular to the current direction. Since the cross-sectional area is the product of the film thickness and width dimension of the sulfurization detection body (length in the direction perpendicular to the current direction), variation in the width dimension of the sulfurization detection body causes individual differences in the speed of sulfurization from the side end faces of the sulfurization detection body. In addition, when the length dimension of the sulfurization detection body along the current direction is varied and when the surface area of the side end portions of the sulfurization detection body is substantially varied, the surface area of the sulfurization detection body exposed to the sulfurization gas is varied, resulting in occurrence of individual differences in the speed of sulfurization from the side end faces of the sulfurization detection body. As a result, it becomes difficult to unambiguously determine the relation between the resistance value and the degree of sulfurization.

The present invention has been made in view of the circumstances of the prior art, and an object thereof is to provide a sulfurization detection sensor capable of accurately detecting the degree of sulfurization.

Solution to Problem

In order to achieve the object above, the present invention provides a sulfurization detection sensor comprising: a rectangular parallelepiped insulation substrate; a pair of electrodes formed at both end portions of a main surface of the insulation substrate, respectively; a sulfurization detection conductor formed between the pair of electrodes; and protective films for covering a portion of the sulfurization detection conductor, the sulfurization detection conductor includes a sulfurization detection portion exposed from the protective films, and when a direction between the pair of electrodes is an X-direction and a direction perpendicular to the X-direction is a Y-direction, specific regions, in which a current hardly flows as compared to other portions of the sulfurization detection portion, being formed at both end portions in the Y-direction of the sulfurization detection portion, respectively.

According to the sulfurization detection sensor configured as above, the specific regions into which a current hardly flows are formed at both end portions in the Y-direction (the direction perpendicular to the current direction) of the sulfurization detection portion. The specific region hardly affects change in a resistance value, and accordingly, even when a sulfurization condition from side end faces of the sulfurization detection portion is varied, it is possible to accurately detect the degree of sulfurization based on the resistance value due to change in the film thickness of the sulfurization detection portion interposed between the specific regions.

In the sulfurization detection sensor configured as above, the sulfurization detection conductor includes wide portions formed at both end portions in the Y-direction of the sulfurization detection conductor, respectively, so as to be wider than width of connection with each of the electrodes, and both end portions in the X-direction of the wide portions are covered with the protective films, whereby making it possible to easily form the specific regions based on the printed shape of the sulfurization detection conductor.

Furthermore, in the sulfurization detection sensor configured as above, a resistor is interposed between the sulfurization detection conductor and at least one of the electrodes, and the resistor is connected to a center portion in the Y-direction of the sulfurization detection conductor, and both end portions in the X-direction of the sulfurization detection conductor and the entire resistor are covered with the protective films, whereby making it possible to define the specific regions by the resistor, and also to make use of the resistor as a resistor unit capable of detecting the degree of sulfurization.

Each FIG. 3A to FIG. 3F is a plan view illustrating a manufacturing process of the sulfurization detection sensor according to the first embodiment.

Each FIG. 4A to FIG. 4F is a cross-sectional view illustrating the manufacturing process of the sulfurization detection sensor according to the first embodiment.

Figure 5:
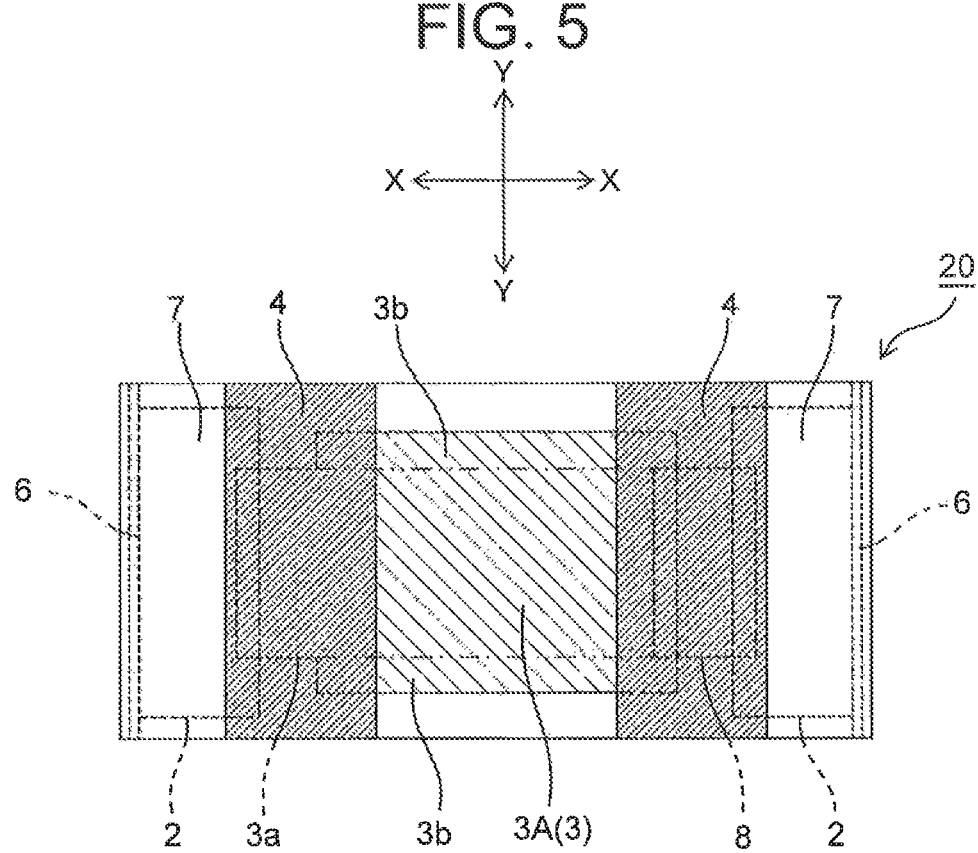

FIG. 5 is a plan view of a sulfurization detection sensor according to a second embodiment of the present invention.

Figure 6:
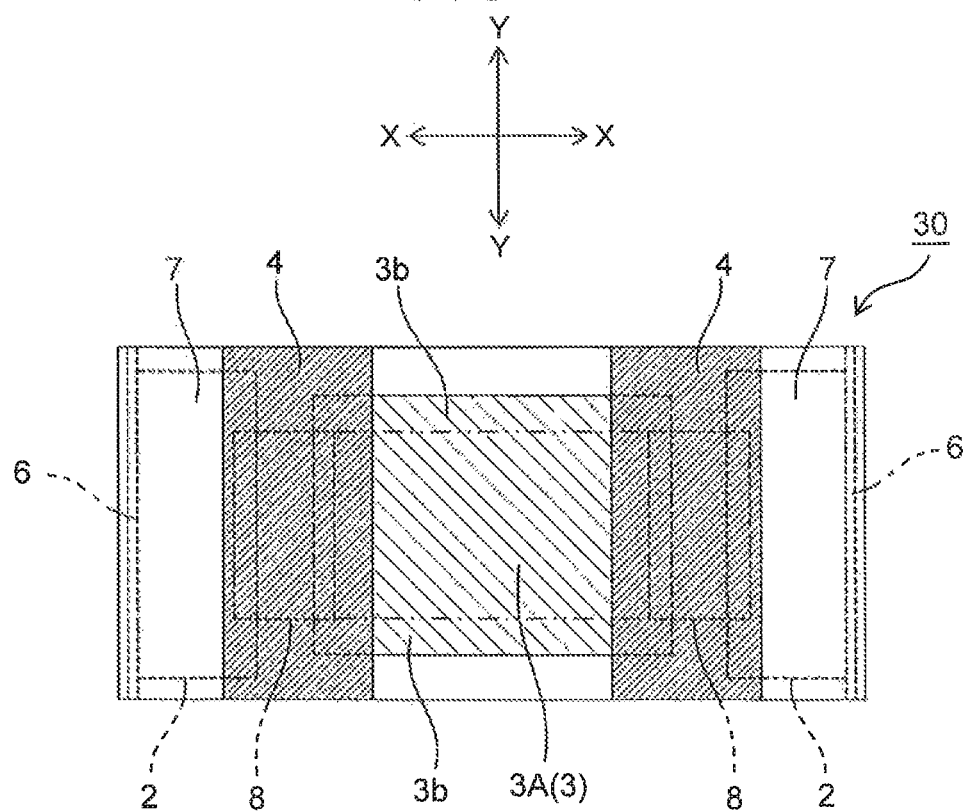

FIG. 6 is a plan view of a sulfurization detection sensor according to a third embodiment of the present invention.

DESCRIPTION OF EMBODIMENTS

Figure 1:
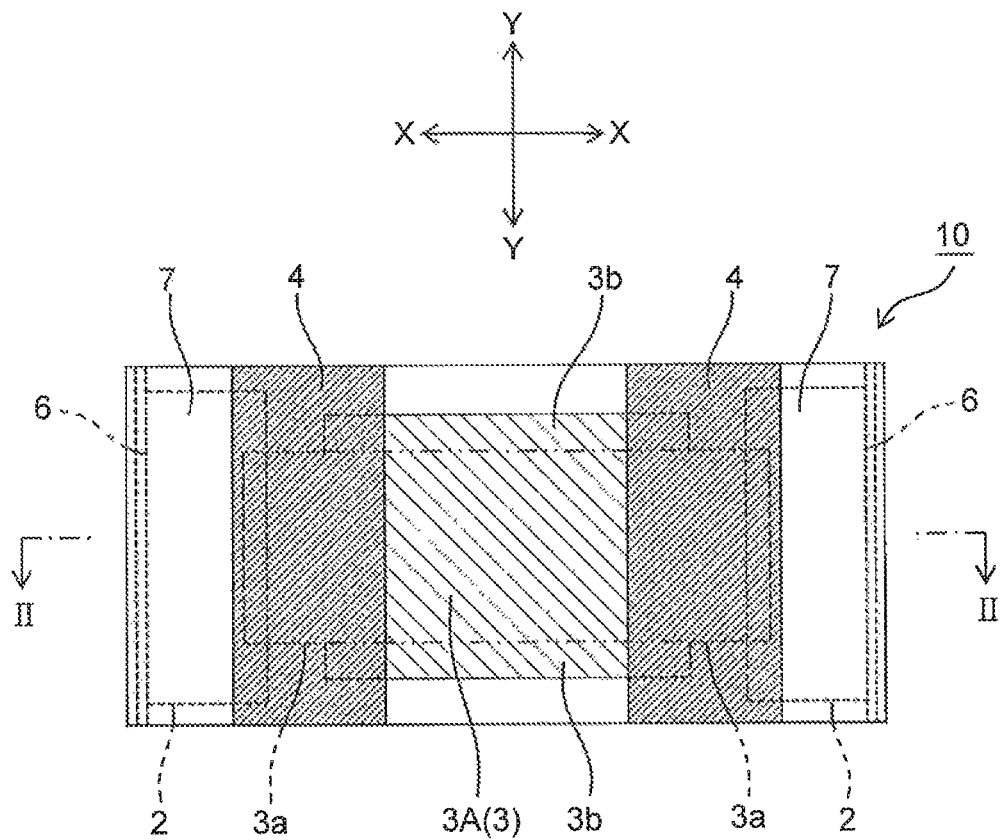
FIG. 1 is a plan view of a sulfurization detection sensor according to a first embodiment of the present invention.
Figure 2:
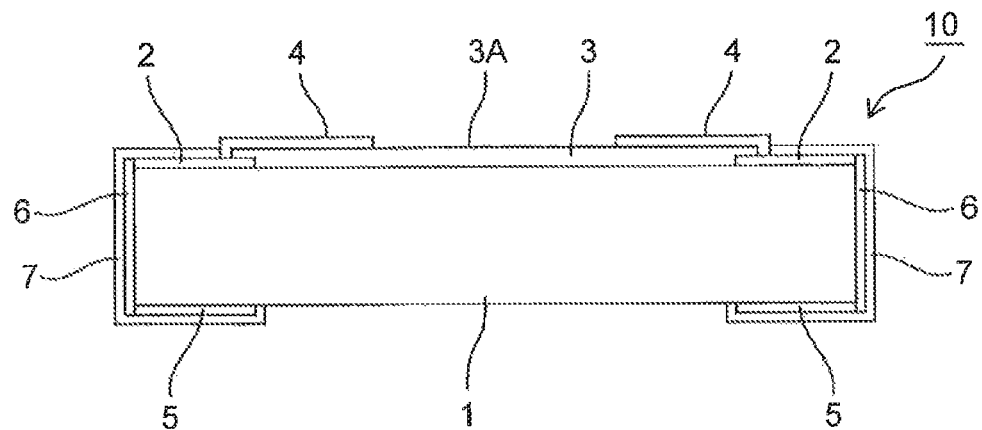
FIG. 2 is a cross-sectional view taken along the line II-II of FIG. 1.

Hereinafter, embodiments of the present invention will be described with reference to the drawings. FIG. 1 is a plan view of a sulfurization detection sensor 10 according to a first embodiment of the present invention. FIG. 2 is a cross-sectional view taken along the line II-II of FIG. 1.

As illustrated in FIG. 1 and FIG. 2, the sulfurization detection sensor 10 according to the first embodiment mainly includes a rectangular parallelepiped insulation substrate 1, a pair of front electrodes 2 provided at both ends of a front surface in the longitudinal direction of the insulation substrate 1, respectively, a sulfurization detection conductor 3 provided to connect between the front electrodes 2, a pair of protective films 4 provided to cover a part of the sulfurization detection conductor 3 and a part of the front electrodes 2, respectively, a pair of back electrodes 5 provided at both ends of a back surface in the longitudinal direction of the insulation substrate 1, respectively, a pair of end face electrodes 6 provided at both ends in the longitudinal direction of the insulation substrate 1, respectively, and a pair of external electrodes 7 provided on front surfaces of the pair of end face electrodes 6, respectively.

The insulation substrate 1 is obtained by dividing a large-sized substrate, which will be described later, along vertical and horizontal division grooves into multiple pieces. The large-sized substrate is formed of a ceramic substrate whose main component is alumina.

The pair of front electrodes 2 is obtained by screen-printing Ag-based paste containing silver as a main component, and drying and firing the printed paste. The pair of front electrodes 2 is formed at both the ends in the longitudinal direction of the insulation substrate 1 so as to face each other with a predetermined space therebetween. The pair of back electrodes 5 is also obtained by screen-printing Ag-based paste containing silver as a main component, and drying and firing the printed paste. The pair of back electrodes 5 is formed at positions corresponding to the positions of the front electrodes 2 on the front surface side of the insulation substrate 1, respectively. In the following, a direction between the pair of front electrodes 2 (lateral direction in FIG. 1) is referred to as an X-direction, and a direction perpendicular to the X-direction (vertical direction in FIG. 1) is referred to as a Y-direction.

The sulfurization detection conductor 3 is obtained by screen-printing Ag-based paste containing silver as a main component, and drying and firing the printed paste. As described above, both the ends of the sulfurization detection conductor 3 are connected to the pair of front electrodes 2, respectively. Both the ends of the sulfurization detection conductor 3 are covered with the pair of protective films 4, respectively, while a portion of the sulfurization detection conductor 3 which is exposed from the pair of protective films 4 serves as a sulfurization detection portion 3A capable of detecting the sulfide gas. The sulfurization detection conductor 3 includes connection portions 3a formed at both ends in the X-direction of the sulfurization detection conductor 3 so as to overlap the front electrodes 2, respectively, and wide portions 3b formed at both ends in the Y-direction of the sulfurization detection conductor 3 so as to be wider than the width of the connection portions 3a, respectively. The sulfurization detection conductor 3 has a cross shape in which the wide portions 3b protrude outwardly, respectively, from the mutually facing long sides of the rectangle whose short sides are the connection portions 3a.

The pair of protective films 4 is made of an insulation material impermeable to sulfide gas such as epoxy resin. The entire connection portions 3a of the sulfurization detection conductor 3 and both ends in the X-direction of the wide portions 3b are covered with the pair of protective films 4.

The pair of end face electrodes 6 is obtained by sputtering Ni/Cr on end faces of the insulation substrate 1, respectively. Each of the end face electrodes 6 is formed so as to provide conduction between the front electrode 2 and the back electrode 5 which correspond to each other.

The pair of external electrodes 7 is composed of a double layer structure having a barrier layer and an external connection layer. The barrier layer is a Ni plating layer formed by electrolytic plating while the external connection layer is an Sn plating layer formed by electrolytic plating. The front surfaces of the front electrodes 2, the end face electrodes 6, and the back electrodes 5 are covered with the external electrodes 7.

Next, a manufacturing process of the sulfurization detection sensor 10 according to the first embodiment will be described with reference to FIG. 3 and FIG. 4. Each FIG. 3A to FIG. 3F is a plan view illustrating a surface of a large-sized substrate used in the manufacturing process. Each FIG.

Figure 4A:
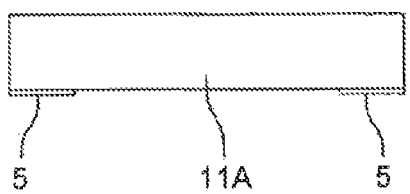
Figure 4D:
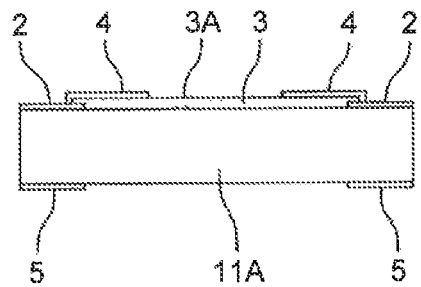
Figure 4B:
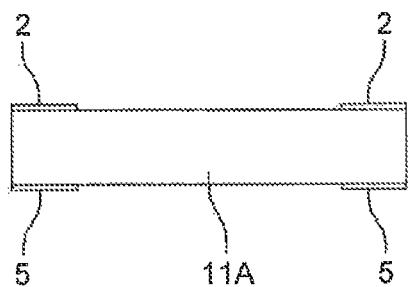
Figure 4E:
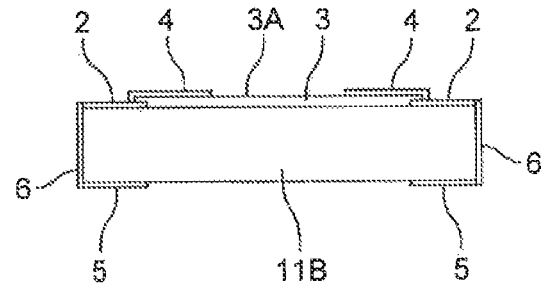
Figure 4C:
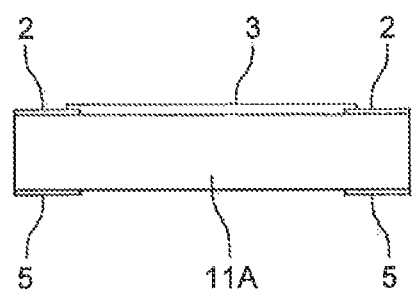
Figure 4F:
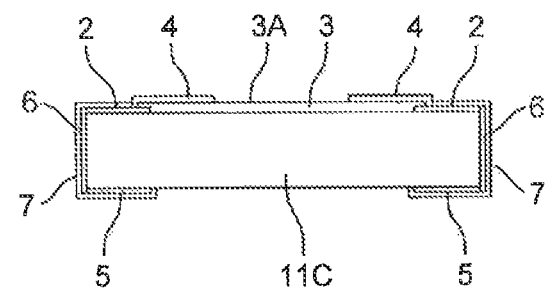

4A to FIG. 4F is a cross-sectional view of one of the chips within the large-sized substrate, which is taken along a center portion of the large-sized substrate in the longitudinal direction thereof.

The first step of the manufacturing process of the sulfurization detection sensor 10 is to prepare a large-sized substrate from which multi-piece insulation substrates 1 are obtained. In the large-sized substrate, primary division grooves and secondary division grooves are provided in advance to form a grid pattern, and each one of the grids divided by the primary division grooves and the secondary division grooves serves as a single chip region. FIG. 3 and FIG. 4 illustrate a large-sized substrate 11A corresponding to a single chip region as a representative, but practically, each step described below is collectively performed with respect to the large-sized substrate corresponding to multi-piece chip regions.

Figure 3A:
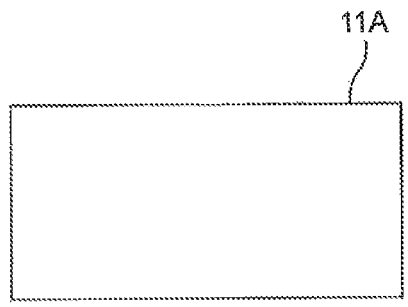
Figure 3D:
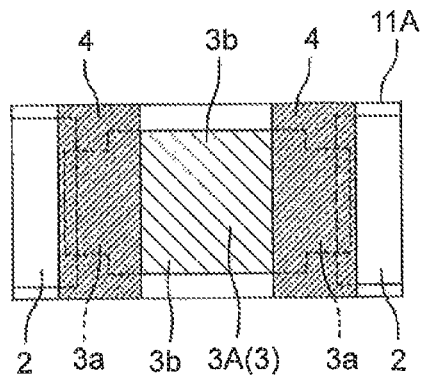
Figure 3B:
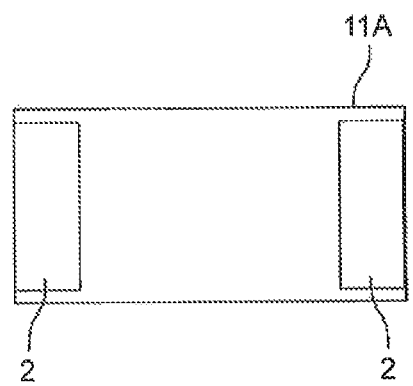

That is, as illustrated in FIG. 3A and FIG. 4A, after screen-printing Ag-based paste on a back surface of the large-sized substrate 11A, by drying and firing the screen-printed paste, the step of forming the pair of back electrodes 4 which faces each other with a predetermined space therebetween on the back surface of the large-sized substrate 11A is performed. At the same time, or before or after the step above, after screen-printing Ag-based paste on a front surface of the large-sized substrate 11A, by drying and firing the screen-printed paste, as illustrated in FIG. 3B and FIG. 4B, the step of forming the pair of front electrodes 2 which faces each other with a predetermined space therebetween on the front surface of the large-sized substrate 11A is performed.

Figure 3E:
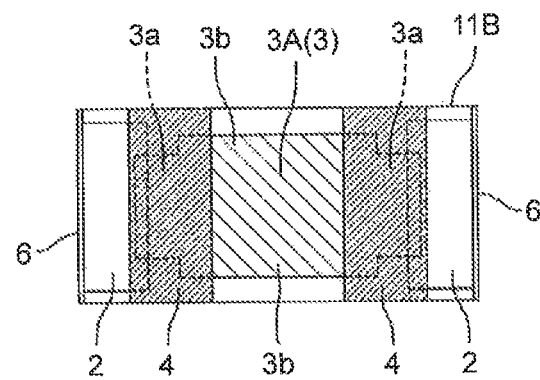
Figure 3C:
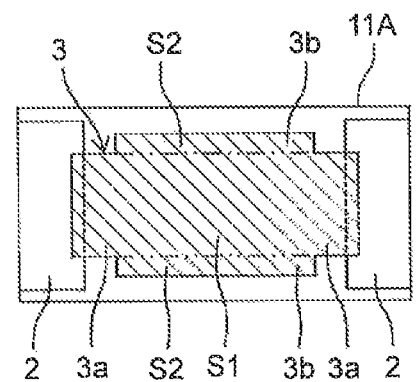

Next, after screen-printing Ag-based paste containing Ag as a main component on the front surface of the large-sized substrate 11A, by drying and firing the screen-printed paste, as illustrated in FIG. 3C and FIG. 4C, the step of forming the sulfurization detection conductor 3 between the pair of front electrodes 2 is performed. The sulfurization detection conductor 3 is shaped by a combination of a rectangular region S1 and long and narrow regions S2. The region S1 has, as its short sides, the connection portions 3a overlapping the pair of front electrodes 2. Each of the long and narrow regions S2 protrudes outwardly from corresponding one of the mutually facing long sides of the region S1. The sulfurization detection conductor 3 includes the width portions 3b which are, respectively, provided at both the ends in the Y-direction of the sulfurization detection conductor 3 and formed wider than the width of connection with each of the front electrodes 2. In terms of the current density in the sulfurization detection conductor 3 connected to the pair of front electrodes 2, the current is distributed to the region S1 which overlaps and is connected to the front electrodes 2, while the regions S2 protruding outwardly from the region S1 serves as specific regions into which the current hardly flows.

Next, after screen-printing epoxy-based resin paste from above the sulfurization detection conductor 3, by heating and curing the printed paste, as illustrated in FIG. 3D and FIG. 4D, the step of forming the pair of protective films 4 covering both ends in the X-direction of the wide portions 3b and the entire connection portions 3a is performed. As a result of the step above, in the region S1 and regions S2 of the sulfurization detection conductor 3, a rectangular portion interposed between the pair of protective films 4 and thus exposed therefrom is formed as the sulfurization detection portion 3A. Thereafter, by screen-printing and drying a soluble masking liquid, the step of forming a masking layer (not illustrated) covering the sulfurization detection sensor 3A of the sulfurization detection sensor 3 is performed.

Next, after primarily dividing the large-sized substrate 11A along the primary division grooves to obtain strip-shaped substrates 11B, by sputtering Ni/Cr on divided faces of each strip-shaped substrate 11B, as illustrated in FIG. 3E and FIG. 4E, the step of forming the pair of end face electrodes 6 on the divided faces of each strip-shaped substrate 11B, respectively, each of which connects between the front electrode 2 and the corresponding back electrode 5 is performed.

Figure 3F:
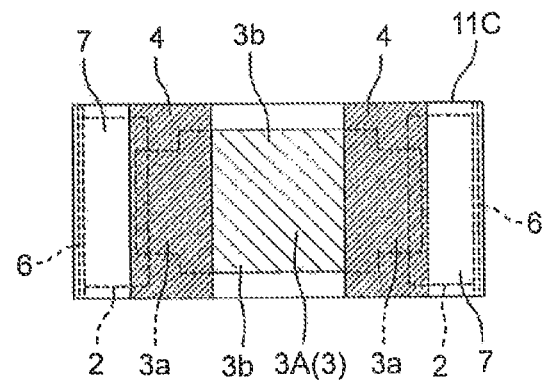

Next, after secondarily dividing the strip-shaped substrates 11B along the secondary division grooves to obtain a plurality of chip-shaped substrates 11C, by performing electrolytic plating with respect to each chip-shaped substrate 11C to form a Ni—Sn plating layer, as illustrated in FIG. 3F and FIG. 4F, the step of forming the pair of external electrodes 7 for covering the front surfaces of the end face electrodes 6 and those of the back electrodes 5 is performed. As the final step, by removing the masking layer described above by using a solvent, the sulfurization detection portion 3A of the sulfurization detection conductor 3 which has been covered with the masking layer is exposed, whereby the process of manufacturing the sulfurization detection sensor 10 as illustrated in FIG. 1 and FIG. 2 is completed.

The sulfurization detection sensor 10 configured as described above is mounted on a circuit board (not illustrated) together with other electronic components, and then used in a state where the circuit board is exposed to an atmosphere containing sulfide gas. As the volume of Ag forming the sulfurization detection portion 3A decreases over time, a resistance value between the pair of front electrodes 2 increases, which, finally, results in disconnection in the sulfurization detection portion 3A. At this time, since the sulfide detection portion 3A in contact with the sulfide gas gets sulfurized not only in the film thickness direction (the direction perpendicular to the paper surface of FIG. 1) from the entire surface facing the insulation substrate 1, but also in the direction toward the inner portion (vertical direction in FIG. 1) from the side end faces of the respective wide portions 3b, the area along the Y-direction decreases and thus the resistance value increases.

In the present embodiment, the sulfurization detection conductor 3 includes the wide portions 3b formed at both the ends in the Y-direction of the sulfurization detection conductor 3, and the wide portions 3b serve as the specific regions into which a current hardly flows (regions S2). In this way, the sulfurization from the side end faces of the wide portions 3b hardly affects change in the resistance value, and accordingly, there is no need to consider the individual differences in the speed of sulfurization from the side end faces of the sulfurization detection conductor 3, which are caused by the printing sag or the like of the wide portions 3b. As a result, it is possible to accurately detect the degree of sulfurization based on the resistance value due to change in the film thickness of the region S1 of the sulfurization detection portion 3A.

As described above, the sulfurization detection sensor 10 according to the first embodiment includes the specific regions S2 into which a current hardly flows, which are formed, respectively, at both the ends in the width direction (Y-direction) of the sulfurization detection portion 3A exposed from the pair of protective films 4. Since the specific regions S2 hardly affect change in the resistance value of the sulfurization detection conductor 3, there is no need to consider the variation in the conditions of sulfurization from the side end faces of the sulfurization detection portion 3A. As a result, it is possible to accurately detect the degree of sulfurization based on the resistance value due to change in the film thickness of the region S1 of the sulfurization detection portion 3A.

Furthermore, in the present embodiment, the shape of the sulfurization detection conductor 3 is formed into a cross as a whole, in which each of the wide portions 3b protrudes outwardly from corresponding one of the mutually facing long sides of the rectangle whose short sides are the connection portions 3a overlapping the pair of front electrodes 2. Still further, the entire connection portions 3a of the sulfurization detection conductor 3 and both the end portions in the X-direction of the wide portion 3b are covered with the pair of protective films 4. As a result, it is possible to easily form the specific regions S2 based on the printed shape of the sulfurization detection conductor 3.

FIG. 5 is a plan view of a sulfurization detection sensor 20 according to a second embodiment of the present invention. In FIG. 5, portions corresponding to those in FIG. 1 are provided with the same reference signs.

As illustrated in FIG. 5, in the sulfurization detection sensor 20 according to the second embodiment, one end in the X-direction of the sulfurization detection conductor 3 is connected to one of the front electrodes 2 via the connection portion 3a whereas the other end in the X-direction of the sulfurization detection conductor 3 is connected to the other one of the front electrodes 2 via a resistor 8. The width of connection on which the connection portion 3a overlaps the one of the front electrodes 2 is the same as the width of connection on which the resistor 8 overlaps the other one of the front electrodes 2. The sulfurization detection conductor 3 has a lateral convex shape in which each of the wide portions 3b protrudes outwardly from corresponding one of the mutually facing long sides of the rectangle whose one of the short sides is the connection portion 3a. In addition, the entire connection portion 3a, the entire resistor 8, and both the ends in the X-direction of the wide portion 3b are covered with the pair of protective films 4, and a portion of the sulfurization detection conductor 3 which is exposed from the protective films 4 serves as the sulfurization detection portion 3A. Although not being illustrated in FIG. 5, the resistor 8 includes a trimming groove for adjustment of the resistance value. The other portions are configured substantially in the same manner as those of the sulfurization detection sensor 10 according to the first embodiment.

As described above, since the sulfurization detection sensor 20 according to the second embodiment also includes the wide portions 3b (specific regions) into which a current hardly flows, which are formed, respectively, at both the ends in the width direction (Y-direction) of the sulfurization detection portion 3A exposed from the pair of protective films 4, there is no need to consider the variation in the conditions of sulfurization from the side end faces of the sulfurization detection portion 3A. As a result, it is possible to accurately detect the degree of sulfurization based on the resistance value due to change in the film thickness of the sulfurization detection portion 3A interposed between the wide portions 3b. Furthermore, since the resistor 8 is connected in series to the sulfurization detection conductor 3, the specific regions as described above can be defined thereby and the resistor 8 can be used as a resistor unit capable of detecting the degree of sulfurization.

FIG. 6 is a plan view of a sulfurization detection sensor 30 according to a third embodiment of the present invention. In FIG. 6, portions corresponding to those in FIG. 5 are provided with the same reference signs.

The sulfurization detection sensor 30 according to the third embodiment illustrated in FIG. 6 is configured basically in the same manner as the sulfurization detection sensor 20 according to the second embodiment, except for the differences to be described below. The differences between them can be found in that the sulfurization detection conductor 3 of the sulfurization detection sensor 30 is formed in a rectangular shape without any connection portions with the front electrodes 2, and both ends in the X-direction of the sulfurization detection conductor 3 are connected to the corresponding front electrodes 2 via the resistors 8, respectively. The sulfurization detection conductor 3 has a rectangular shape in which each of the wide portions 3b protrudes outwardly from one of the mutually facing long sides of the rectangle whose short sides are connected to the resistors 8, respectively, and both the ends in the X-direction of the wide portions 3b and the entire resistors 8 are covered with the protective films 4.

As described above, since the sulfurization detection sensor 30 according to the third embodiment also includes the wide portions 3b (specific regions) into which a current hardly flows, which are formed, respectively, at both the ends in the width direction (Y-direction) of the sulfurization detection portion 3A exposed from the pair of protective films 4, there is no need to consider the variation in the conditions of sulfurization from the side end faces of the sulfurization detection portion 3A. As a result, it is possible to accurately detect the degree of sulfurization based on the resistance value due to change in the film thickness of the sulfurization detection portion 3A interposed between the wide portions 3b. Furthermore, since the two resistors 8 are connected in series via the sulfurization detection conductor 3, the specific regions as described above can be defined thereby and the resistors 8 can be used as resistor units capable of detecting the degree of sulfurization. Still further, it is also possible to realize a sulfurization detection sensor which is bilaterally symmetrical without directionality.

REFERENCE SIGNS LIST 1 insulation substrate
2 front electrode (electrode)
3 sulfurization detection conductor
3A sulfurization detection portion
3a connection portion
3b wide portion (specific portion)
4 protective film
5 back electrode
6 end face electrode
7 external electrode
8 resistor
10, 20, 30 sulfurization detection sensor

The invention claimed is:
1. A sulfurization detection sensor comprising:
a rectangular parallelepiped insulation substrate;
a pair of electrodes formed at both end portions of a main surface of the insulation substrate, respectively;
a sulfurization detection conductor formed between the pair of electrodes; and
protective films for covering a portion of the sulfurization detection conductor,
the sulfurization detection conductor includes a sulfurization detection portion exposed from the protective films, and
when a direction between the pair of electrodes is an X-direction and a direction perpendicular to the X-direction is a Y-direction, specific regions, in which a current hardly flows as compared to other portions of the sulfurization detection portion, being formed at both end portions in the Y-direction of the sulfurization detection portion, respectively.

2. The sulfurization detection sensor according to claim 1, wherein the sulfurization detection conductor includes wide portions formed at both end portions in the Y-direction of the sulfurization detection conductor, respectively, so as to be wider than width of connection with each of the electrodes, and both end portions in the X-direction of the wide portions are covered with the protective films.

3. The sulfurization detection sensor according to claim 1, wherein a resistor is interposed between the sulfurization detection conductor and at least one of the electrodes, and the resistor is connected to a center portion in the Y-direction of the sulfurization detection conductor, and both end portions in the X-direction of the sulfurization detection conductor and the entire resistor are covered with the protective films.

* * * * *